United States Patent Office 3,422,195
Patented Jan. 14, 1969

3,422,195
ANTIHISTAMINIC AND MOTION SICKNESS PREVENTING COMPOSITIONS
Gerrit Alberda, Amsterdam, Netherlands, assignor, by mesne assignments, to A C F (Amsterdam Chemie Farmacie) N.V., Amsterdam, Netherlands, a limited-liability company of the Netherlands
No Drawing. Filed Sept. 22, 1964, Ser. No. 398,441
Claims priority, application Netherlands, Sept. 27, 1963, 298,472; Sept. 14, 1964, 6410669
U.S. Cl. 424—250         3 Claims
Int. Cl. A61k 25/00; C07d 51/00

This invention relates to new antihistaminic motion sickness preventing compositions.

It is known that cinnarizine (1-cinnamyl-4-benzhydrylpiperazine) and its acid addition salts possess a strong antihistaminic activity (for example, as indicated in British Patent 809,760, particularly with respect to compound 6 of the table therein).

It is also known that cyclizine and chlorcyclizine and their physiologically acceptable acid addition salts, for example, 1-(4-chlorobenzhydryl)-4-methylpiperazine dihydrochloride (the Merck Index, 7th ed., 1960, page 236), can be used as antihistaminic agents.

By experiments with the above mentioned antihistaminics, it has been found surprisingly that mixtures of cinnarizine and/or its physiologically acceptable acid addition salts with cyclizine, and/or chlorcyclizine, and/or their physiologically acceptable acid addition salts possess much stronger antihistaminic activity than would be expected from mere addition of the individual activities of the components.

The amount of each component present in the mixture can be varied within wide ranges but, preferably, from about 10 to about 90%, by weight, of the mixture of said substances.

In the following table some results are listed showing the potentiating effect of mixtures according to the invention. The antihistaminic activity was measured in guinea pigs with the method described by E. G. van Proosdij-Hartzema et al., Acta Physiol. Pharmacol. Neerl. 8, 339–340 (1959).

Percentages of guinea pigs protected against the influence of histamine at various intervals after oral administration of the compounds and compositions indicated:

1962 ii, 852) and makes it necessary that the drug be taken rather long before the beginning of the journey. This can easily be forgotten because of the excitement preceding the departure.

On the other hand, drugs lacking this drawback often have the disadvantage of a short lasting action, so that they must be taken frequently. This is inconvenient, especially on a long journey.

Now, with regard to their antimotion sickness properties, it has been found that the new compositions according to the invention have none of the disadvantages mentioned before. On the contrary, their onset of action is very fast, whereas the protection obtained lasts for several hours. Some results obtained with preparations based on mixtures according to the invention, especially regarding their influence on the labyrinth, will be published shortly by W. J. Oosterveld.

Recapitulating, it is an object of the invention to procure new, potentiating antihistaminic compositions, and another object is to procure compositions having a fast onset of action as well as a long lasting action in preventing motion sickness. A further object can be seen in the method of preventing motion sickness by using preparations containing the new compositions.

The last-mentioned preparations can be prepared by mixing the compositions according to the invention with suitable pharmaceutical carriers such as lactose, amylum, talc, magnesium stearate, and the like, and making up the resulting mixture into tablets, pills, powders, potions and the like.

The following examples only serve to illustrate the methods by which the compositions and preparations according to the invention can be obtained but are not to be construed as limiting the invention to the particular methods or the particular compounds specifically described.

Example 1

For the preparation of a potentiating composition according to the invention, 5 grams of 1-cinnamyl-4-benzhydrylpiperazine are intimately mixed with 5 grams of 1-diphneyl-4-methylpiperazine lactate.

Example 2

In a mortar, 8 grams of 1-cinnamyl-4-benzhydrilpiperazine dihydrochloride is rubbed down and thereupon

TABLE

| Administered compounds [1] | Dose in mg./kg. [2] | Percentage of animals protected after— | | | | | |
|---|---|---|---|---|---|---|---|
| | | 15 min. | 30 min. | 1 hour | 2 hours | 4 hours | 24 hours |
| Cinnarizine | 5 | | 0 | 0 | | | 0 |
| Cinnarizine | 10 | | 20 | 30 | | | 60 |
| Cyclizine | 5 | | 50 | | | | 0 |
| Chlorcyclizine | 5 | 10 | 60 | 90 | 60 | 0 | 0 |
| Cinnarizine plus Cyclizine | 5 5 | | 80 | 100 | | | 100 |
| Cinnarizine plus Chlorcyclizine | 5 5 | 60 | 100 | 100 | 100 | 100 | 100 |

[1] In these experiments, cinnarizine and chlorcyclizine were both administered as the hydrochlorides, whereas cyclizine was given as the lactate.
[2] Expressed in milligrams of the free base.

It is known from several publications that some antihistaminics can also be used in preventing motion sickness (for example, as in L. N. Gay et al., The Prevention and Treatment of Motion Sickness, Bull. John Hopkins Hosp., 1949, 84, 470), and the new compositions according to the invention were further examined as to their antimotion sickness properties.

One of the most important disadvantages of several known drugs used in the prevention of motion sickness is their delayed onset of action. This retardation sometimes amounts to two or more hours (see Brit. Med. J., mixed thoroughly with 8 grams of ground 1-(4-chlorobenzhydril)-4-methylpiperazine dihydrochloride. To the mixture are added 144 grams of lactose and mixing is continued until it is homogeneous. The composition is divided into powders of 0.5 gram each, which can be used directly by oral administration.

Example 3

For the preparation of tablets useful in preventing motion sickness, 1.25 grams of cinnarizine, 2.5 grams of chlorcyclizine hydrochloride (or cyclizine lactate), 4.75 grams of lactose, 2.5 grams of maize flour, 0.25 gram of talc, 0.15 gram of magnesium stearate and 0.1 gram of sunset yellow are intimately mixed and made up into 100 tablets which can be orally administered.

The above formula is a preferred preparation. However, the proportion of the active components can be varied widely. The only condition is that each component is present in a potentiating amount to give a faster onset of action and/or an increased duration of activity to the composition.

What is claimed is:

1. Antihistaminic and motion sickness preventing composition containing, as its essential active ingredients, a first compound selected from the group consisting of cinnarizine and its physiologically acceptable acid addition salts, in combination with a second compound selected from the group consisting of cyclizine, chlorcyclizine and their physiologically acceptable acid addition salts, the by weight ratio of said first compound to said second compound being in the range from 1:1 to 1:2.

2. Antihistaminic and motion sickness preventing composition as in claim 1; in which said first and second compounds are present as an intimate mixture in the composition.

3. The method of preventing motion sickness in humans and animals by orally administering to a being susceptible to motion sickness therapeutically effective amounts of a composition containing, as its essential active ingredients, a first compound selected from the group consisting of cinnarizine and its physiologically acceptable acid addition salts, in combination with a second compound selected from the group consisting of cyclizine, chlorcyclizine and their physiologically acceptable acid addition salts, the by weight ratio of said first compound to said second compound being in the range from 1:1 to 1:2.

References Cited

FOREIGN PATENTS 809,760   3/1959   Great Britain.

OTHER REFERENCES

Merck Index, 7th ed., published by Merck and Co., Inc., Rahway, N.J., 1960, pp. 236, 308 and 309.

RICHARD L. HUFF, *Primary Examiner.*